United States Patent
Ishitobi (10) Patent No.: US 11,123,665 B2
(45) Date of Patent: Sep. 21, 2021

(54) SEPARATION APPARATUS

(71) Applicant: KENDENSHA CO., LTD., Izumo (JP)

(72) Inventor: Ryuichi Ishitobi, Izumo (JP)

(73) Assignee: KENDENSHA CO., LTD., Shimane (JP)

( * ) Notice: Subject to any disclaimer, the term of this patent is extended or adjusted under 35 U.S.C. 154(b) by 495 days.

(21) Appl. No.: 15/751,824

(22) PCT Filed: Sep. 5, 2016

(86) PCT No.: PCT/JP2016/075967
§ 371 (c)(1),
(2) Date: Feb. 9, 2018

(87) PCT Pub. No.: WO2018/042647
PCT Pub. Date: Mar. 8, 2018

(65) Prior Publication Data
US 2020/0215467 A1 Jul. 9, 2020

(51) Int. Cl.
*B01D 33/15* (2006.01)
*B01D 33/37* (2006.01)

(52) U.S. Cl.
CPC .............. *B01D 33/15* (2013.01); *B01D 33/37* (2013.01)

(58) Field of Classification Search
CPC ................................ B01D 33/15; B01D 33/37
See application file for complete search history.

(56) References Cited

U.S. PATENT DOCUMENTS

| | | | |
|---|---|---|---|
| 1,960,693 A * | 5/1934 | Bryant | F16H 57/0421 184/15.1 |
| 4,696,151 A * | 9/1987 | Hobbs | A01F 12/442 56/14.6 |

FOREIGN PATENT DOCUMENTS

| | | | |
|---|---|---|---|
| CH | 673958 A5 * | 4/1990 | ........... B01D 33/275 |
| CN | 103826716 A | 5/2014 | |

(Continued)

OTHER PUBLICATIONS

Ishinobu, Minoru—JP 3181644 U Machine Translation (Year: 2013).*

(Continued)

*Primary Examiner* — Bradley R Spies
(74) *Attorney, Agent, or Firm* — Cheng Law Group, PLLC (57) ABSTRACT

The present invention is to provide a separation apparatus for separating a liquid from a treated object containing the liquid in the course of a process of sending the treated object with each rotating plate being rotated, wherein efficient separation of the liquid from the treated object can be performed, while the rotating plates are efficiently prevented from getting damaged. The separation apparatus comprises a plurality of rotating shafts 9 formed in a lateral direction while being arranged in parallel in a longitudinal direction, a driving device 7 for rotationally driving each rotating shaft 9, and a plurality of rotating plates 12 mounted on each rotating shaft 9 in parallel in a lateral direction while being in such an attitude that their plate thickness direction is oriented in a direction along the lateral direction, wherein spaces S1, S2 through which the liquid contained in the treated object is allowed to drop are formed between the mutually adjacent rotating plates 12 in the lateral direction or those in the longitudinal direction, the rotating plates 12 are configured so as to periodically repeat a state of being projected upward and a state of being not projected upward, while being elastically deformable in a direction along said each rotating shaft 9.

4 Claims, 8 Drawing Sheets

(56) References Cited

FOREIGN PATENT DOCUMENTS

| | | |
|---|---|---|
| EP | 2 883 588 A1 | 6/2015 |
| JP | 58-127248 U | 8/1983 |
| JP | 11-197417 A | 7/1999 |
| JP | 2003-211293 A | 7/2003 |
| JP | 2007-307512 A | 11/2007 |
| JP | 3181644 U | 2/2013 |
| JP | 2014-57928 A | 4/2014 |
| JP | 2014-76418 A | 5/2014 |
| JP | 2015-134332 A | 7/2015 |
| JP | 2015-157256 A | 9/2015 |
| JP | 2016-13556 A | 1/2016 |
| KR | 10-2015-0004434 A | 1/2015 |
| WO | WO-2014/045467 A1 | 3/2014 |

OTHER PUBLICATIONS

Ishinobu, Minoru—JP 2016013556 A Machine Translation (Year: 2016).*
Asper, Theodor—CH 673958 A5 Machine Translation (Year: 1990).*
International Search Report for the Application No. PCT/JP2016/075967 dated Nov. 22, 2016.

* cited by examiner

SEPARATION APPARATUS

TECHNICAL FIELD

This invention relates to a separation apparatus for separating a liquid from a treated object containing the liquid.

BACKGROUND ARTS

It is known that there is a separation apparatus having a plurality of rotating shafts formed in a direction crossing a treated object sending direction in planar view while being arranged in parallel in the treated object sending direction, a driving device for rotationally driving each rotating shaft, and a plurality of rotating plates mounted on each rotating shaft in parallel in an axial direction while being in such an attitude that their plate thickness direction is oriented in a direction along each rotating shaft, wherein spaces through which a liquid contained in a treated object is allowed to drop are formed between the mutually adjacent rotating plates in the treated object sending direction or those in the axial direction of each rotating shaft, the rotating plates are configured so as to periodically repeat a state of being projected upward and a state of being not projected upward during rotation by the driving device, and the treated object is sent with each rotating plate rotationally driven by the driving device to thereby perform separation of the liquid from the treated object (See the following patent document 1, for instance).

TECHNICAL LITERATURE IN RELATED ARTS

Patent Document

Patent document 1: Japanese Unexamined Patent Application Publication No. 2016-13556

SUMMARY OF THE INVENTION

Problems to be Solved by the Invention

According to the solid-liquid separation apparatus as disclosed in the above patent document, the rotating plates are configured so as to periodically repeat the state of being projected upward and the state of being not projected upward at the time when the treated object is sent by rotation of the rotating plates, thus allowing a separating action for the liquid from the treated object to be promoted. Meanwhile, the treated object or the like being present between the rotating plates which are in the upward projected state while being mutually adjacent in the axial direction of each rotating shaft causes a situation in which a load in the axial direction of each rotating shaft acts on such rotating plates, resulting in that the rotating plates sometimes get damaged depending on a magnitude of that load.

An object of the present invention is to provide a separation apparatus for separating a liquid from a treated object containing the liquid in the course of a process of sending the treated object with each rotating plate being rotated, wherein efficient separation of the liquid from the treated object can be performed, while the rotating plates are efficiently prevented from getting damaged.

Means for Solving the Problems

To solve the above problem, there is provided a separation apparatus which is to separate a liquid from a treated object containing the liquid and comprises a plurality of rotating shafts formed in a direction crossing a treated object sending direction in planar view while being arranged in parallel in the treated object sending direction, a driving device for rotationally driving each rotating shaft, and a plurality of rotating plates mounted on each rotating shaft in parallel in an axial direction while being in such an attitude that their plate thickness direction is oriented in a direction along each rotating shaft, wherein spaces through which the liquid contained in the treated object is allowed to drop are formed between the mutually adjacent rotating plates in the treated object sending direction or those in the axial direction of each rotating shaft, the rotating plates are configured so as to periodically repeat a state of being projected upward and a state of being not projected upward during rotation by the driving device, while being elastically deformable in a direction along each rotating shaft, and the treated object is sent with each rotating plate rotationally driven by the driving device to thereby perform separation of the liquid from the treated object.

It may be possible also that the rotating plate is formed in an elliptic shape.

It may be possible also that the rotating plate includes an elastically deformable metal plate spring.

It may be possible also that the separation apparatus further comprises a compressing member for compressing the treated object being sent by rotation of the rotating plates in such a manner as to press the treated object downward from its upper side, wherein a lower surface of the compressing member is integrally formed with a downwardly projecting protrusion, and the protrusion is provided so as not to be along a rotation locus of any rotating plate in a range where no overlapping with the rotation locus is caused, as viewed in the axial direction of each rotating shaft.

It may be possible also that the protrusion includes a plurality of protrusions formed on the lower surface of the compressing member.

It may be possible also that the driving device has an actuator and an annular-shaped chain and is configured so as to transmit power of the actuator to each rotating shaft through the chain, wherein an oil reservoir part in which lubricating oil is stored is provided below the chain, and the chain is configured so as to have a sagged-down lower side portion such that at least its part is immersed in the lubricating oil stored in the oil reservoir part.

Effects of the Invention

Since the rotating plates are configured so as to periodically repeat the state of being projected upward and the state of being not projected upward during rotation, efficient separation of the liquid from the treated object can be performed. In addition, since the rotating plates themselves are elastically deformed even when a load in the axial direction of each rotating shaft acts on the rotating plates, damages to the rotating plates caused by such load are efficiently prevented.

EXPLANATION OF REFERENCE NUMERALS

7: Driving device
9: Rotating shaft
12: Rotating plate (Rotating body)
21: Motor (Actuator)
26: Power transmission chain (Chain)
30: Oil tank (Oil reservoir part)
33: Compressing plate (Compressing member)
37: Resistive body (Protrusion)
D: Rotation locus
S1: Space
S2: Slit (Space)

MODE FOR EMBODYING THE INVENTION

Figure 1:
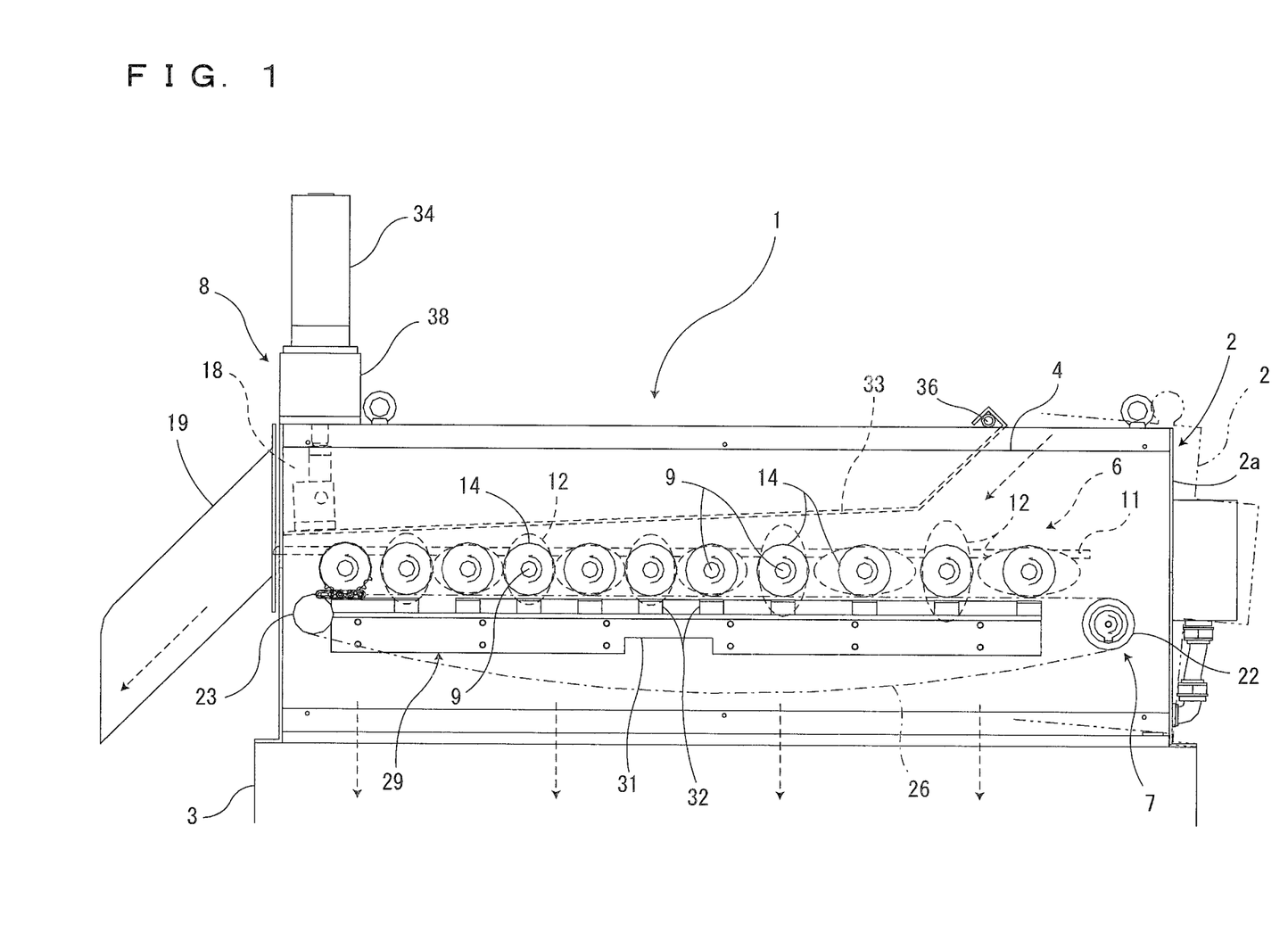
FIG. 1 is a sectional side view showing an overall configuration of a separation apparatus obtained by application of the present invention.
Figure 2:
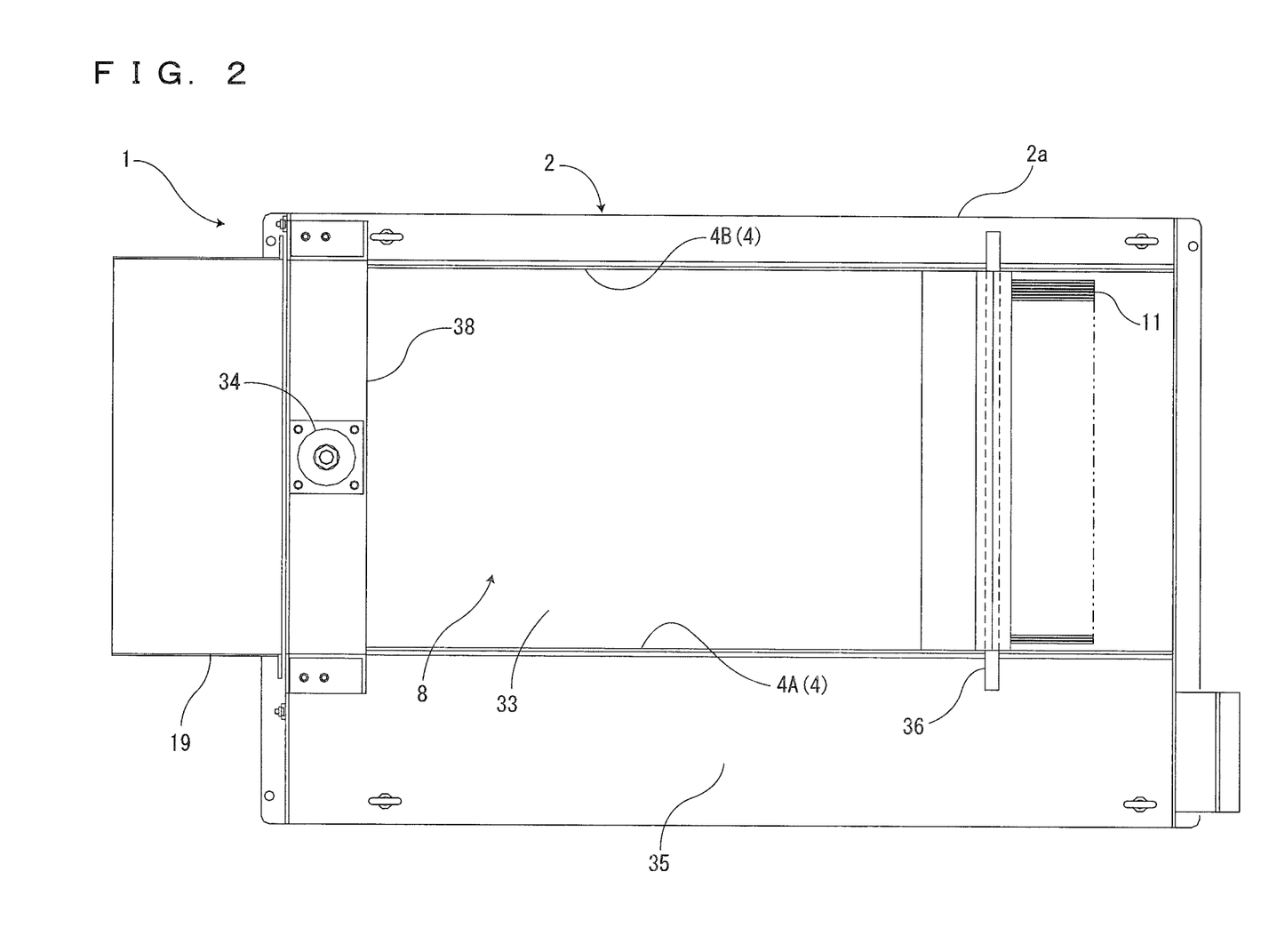
FIG. 2 is a plan view showing the overall configuration of the separation apparatus obtained by application of the present invention.

FIGS. 1 and 2 are a sectional side view and a plan view respectively showing an overall configuration of a separation apparatus obtained by application of the present invention. An illustrated separation apparatus (a solid-liquid separation apparatus) 1 is to separate (mainly, dehydrate) a liquid (mainly, water) from a treated object consisting of a mixture of a solid with the liquid in the course of a treated object sending process. This separation apparatus 1 has an apparatus body 2 on an upper side and a lower frame 3 on a lower side for supporting the apparatus body 2 from below.

The lower frame 3 also serves as a box-shaped waste liquid tank with its top opened. The liquid separated from the treated object by the apparatus body 2 is temporarily stored in the waste liquid tank 3 after being dropped therein.

The apparatus body 2 is supported on the lower frame 3-side in a vertically swingable manner so as to be switchable between an attitude (a horizontal attitude) in which the apparatus body is horizontal as shown by a solid line in FIG. 1 and an attitude (an inclined attitude) in which the apparatus body is inclined upward toward a downstream side in a treated object sending direction as shown by an imaginary line in FIG. 1. Here, the downstream side and an upstream side in the treated object sending direction are respectively defined as forward and backward, while a direction crossing (more specifically, intersecting) the treated object sending direction (a longitudinal direction) is defined as a horizontal direction (a lateral direction).

The apparatus body 2 is formed in a rectangular shape with its longitudinal direction oriented in the above-mentioned longitudinal direction in planar view. The apparatus body 2 has a box-shaped frame body 2a with both of its top and bottom opened, a treatment part 6 arranged between a pair of left and right plate-shaped side frames 4, 4 mutually opposed in parallel as part of constitution of the frame body 2a to perform treatment of the treated object, a driving mechanism (a driving device) 7 arranged on a surface (an outer side surface) on the side opposite to a surface of one side frame 4 (a side frame 4A on a drive side) confronting the other side frame 4 (a side frame 4B on a non-drive side) to drive the treatment part 6, and a compressing mechanism (a compressing device) 8 arranged right above the treatment part 6 to perform compressing of the treated object.

First, a configuration of the treatment part 6 will be described with reference to FIGS. 1 to 6.

Figure 3:
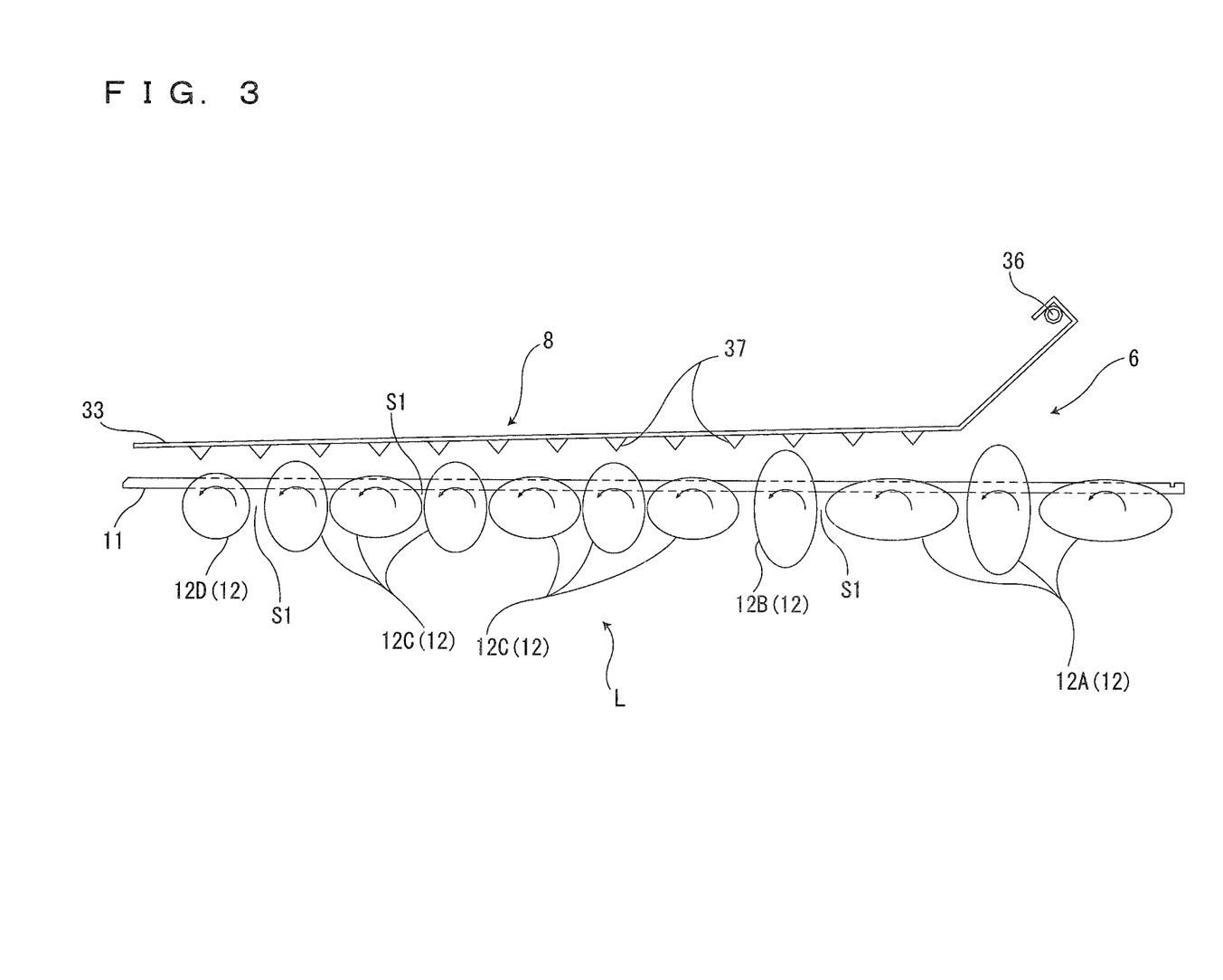
FIG. 3 is a side view showing a treatment part.
Figure 4:
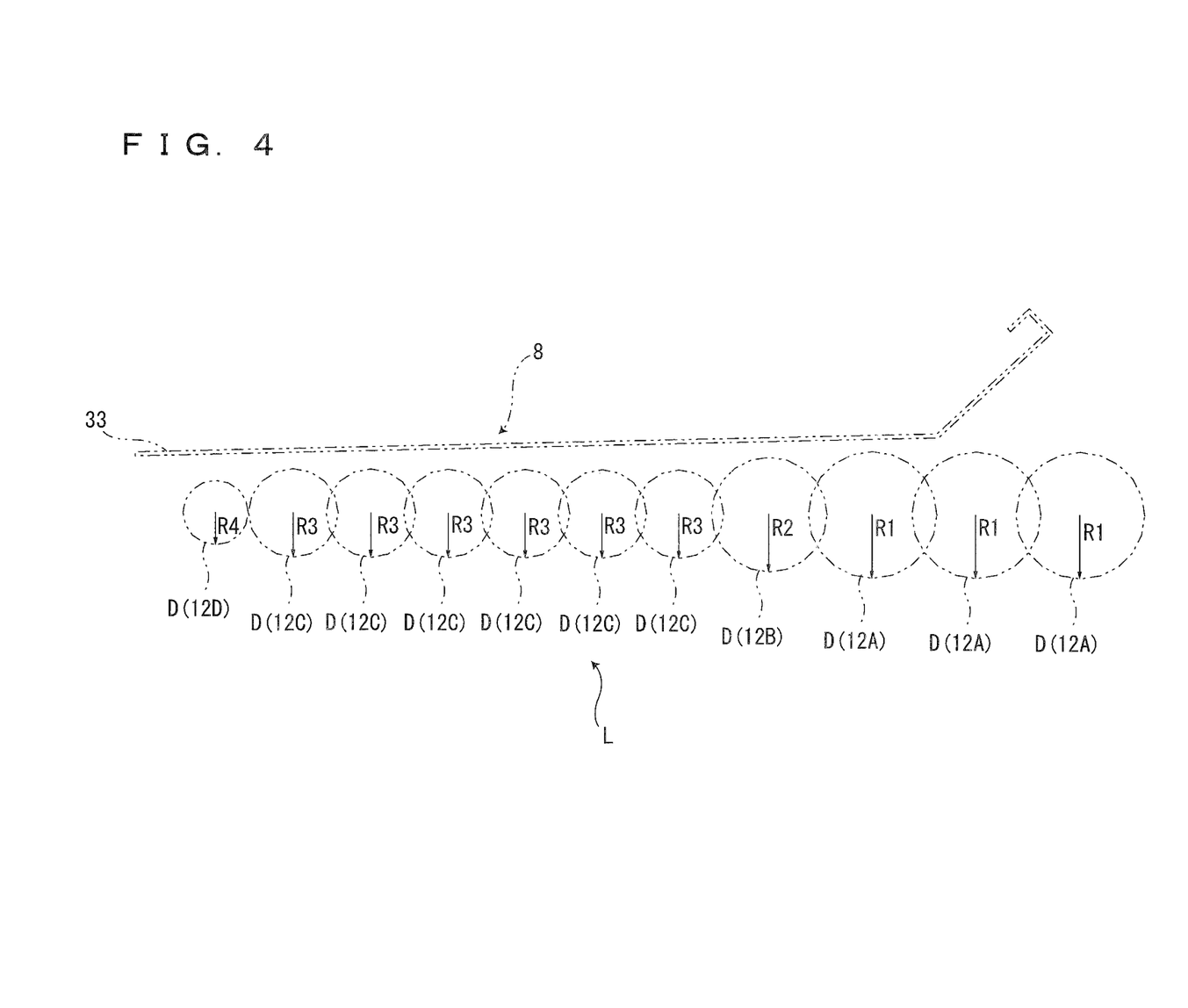
FIG. 4 is a side view showing each rotation locus of rotating plates arranged in parallel in a sending direction in the treatment part.
Figure 5:
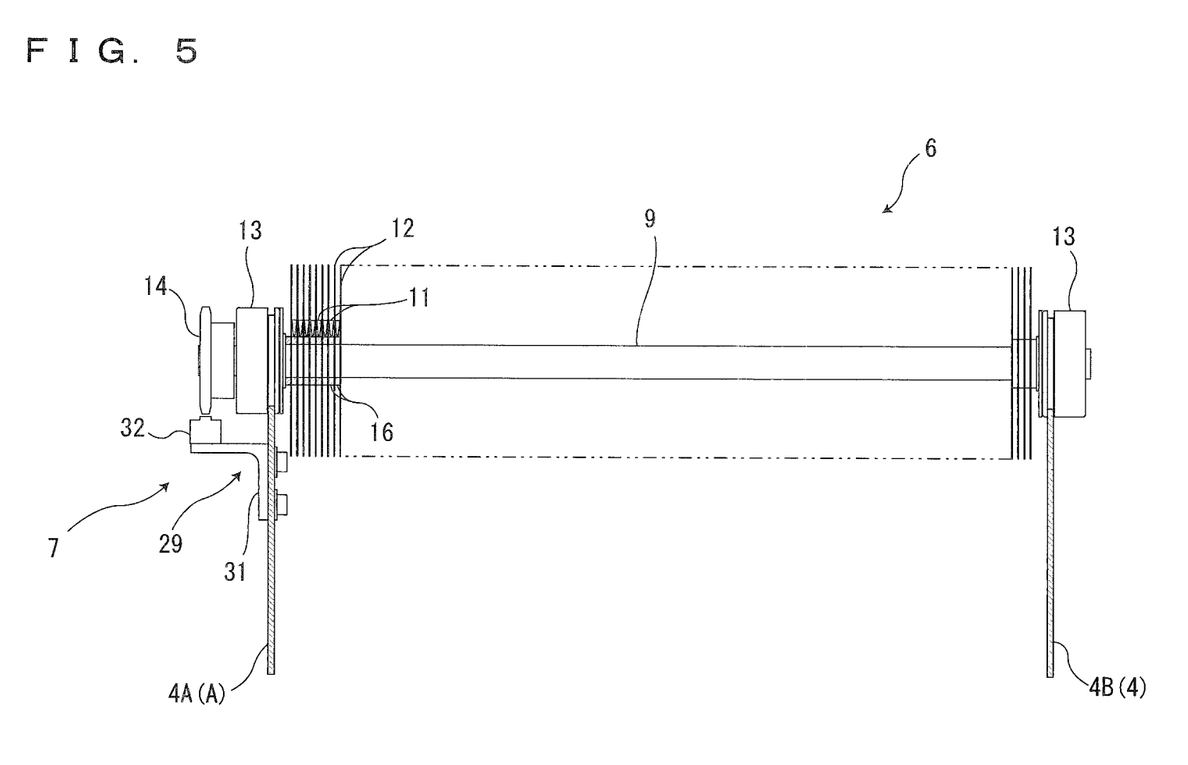
FIG. 5 is a rear view showing the treatment part.
Figure 6:
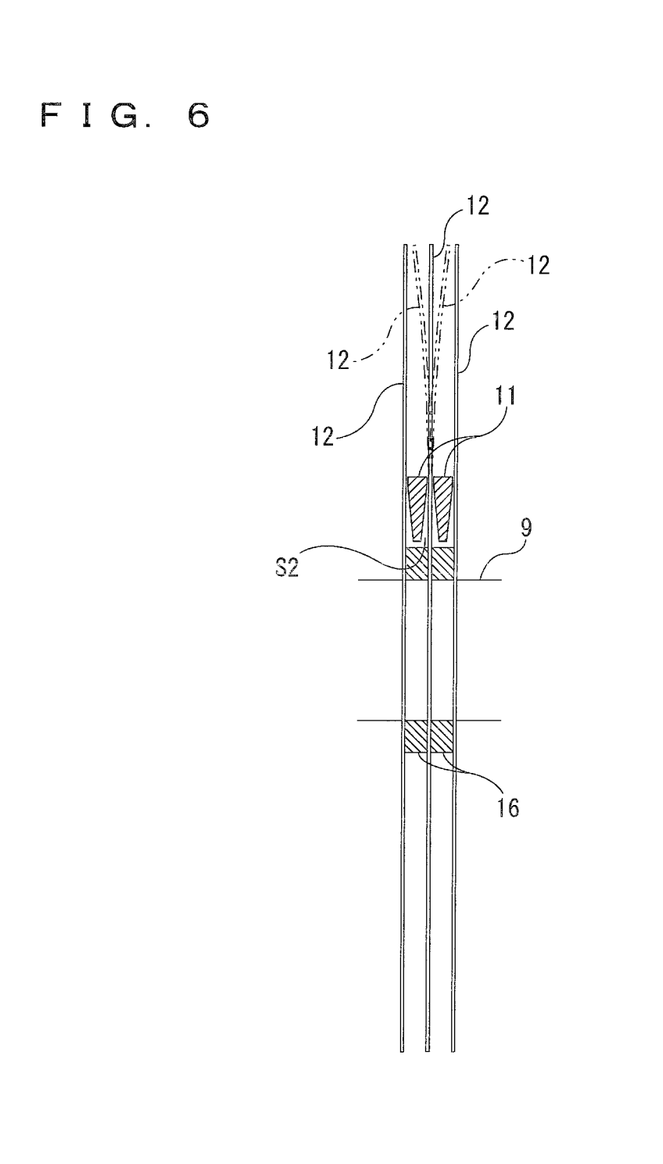
FIG. 6 is an enlarged-scale view showing a main part in FIG. 5.

FIG. 3 is a side view showing the treatment part, FIG. 4 is a side view showing each rotation locus of rotating plates arranged in parallel in a sending direction in the treatment part, FIG. 5 is a rear view showing the treatment part, and FIG. 6 is an enlarged-scale view showing a main part in FIG. 5. The treatment part 6 has a plurality of rotating shafts 9 laid and supported between the left and right side frames 4, 4 in a rotatable manner while being formed in a direction (a horizontal or lateral direction) crossing (more specifically, intersecting) the treated object sending direction in planar view, a plurality of guide bars (guide members) 11 mounted and fixed to the frame body 2a-side at positions between the left and right side frames 4, 4 while being formed in the longitudinal direction, and a plurality of rotating plates (rotating bodies) 12 mounted on each rotating shaft 9 in an integrally rotated manner while being formed in a circular or elliptic shape as viewed in the axial direction of each rotating shaft (in side view).

The plurality of rotating shafts 9 are arranged in parallel in the treated object sending direction so as to be parallel with each other. Each rotating shaft 9 is supported rotatably around its own axis by bearings 13, 13 installed on the outer side surfaces of the left and right side frames 4, 4. The mutually adjacent rotating shafts 9, 9 in the longitudinal direction are spaced at predetermined intervals so as to allow rotation of the rotating plates 12 mounted on each of the rotating shafts 9, 9.

The rotating plates 12 are mounted and fixed in such an attitude that their plate thickness direction is oriented (perpendicular to each rotating shaft 9) in a direction along each rotating shaft 9 (more specifically, a direction parallel with each rotating shaft 9). For more details, when mounting the rotating plates 12 on each rotating shaft 9, the rotating plates 12 are to be mounted and fixed to each rotating shaft 9, with each rotating shaft 9 inserted through a center of an elliptic or circular face of each rotating plate 12.

Each rotating shaft 9 is mounted with the plurality of rotating plates 12 in parallel in the axial direction of each rotating shaft 9 (the lateral direction) at predetermined intervals (uniform intervals for the embodiment shown). The plurality of rotating plates 12 mounted on the same rotating shaft 9 in parallel in the lateral direction are parallel with each other while being set to have the same position (the same phase) around an axis of each rotating shaft 9.

Figure 7:
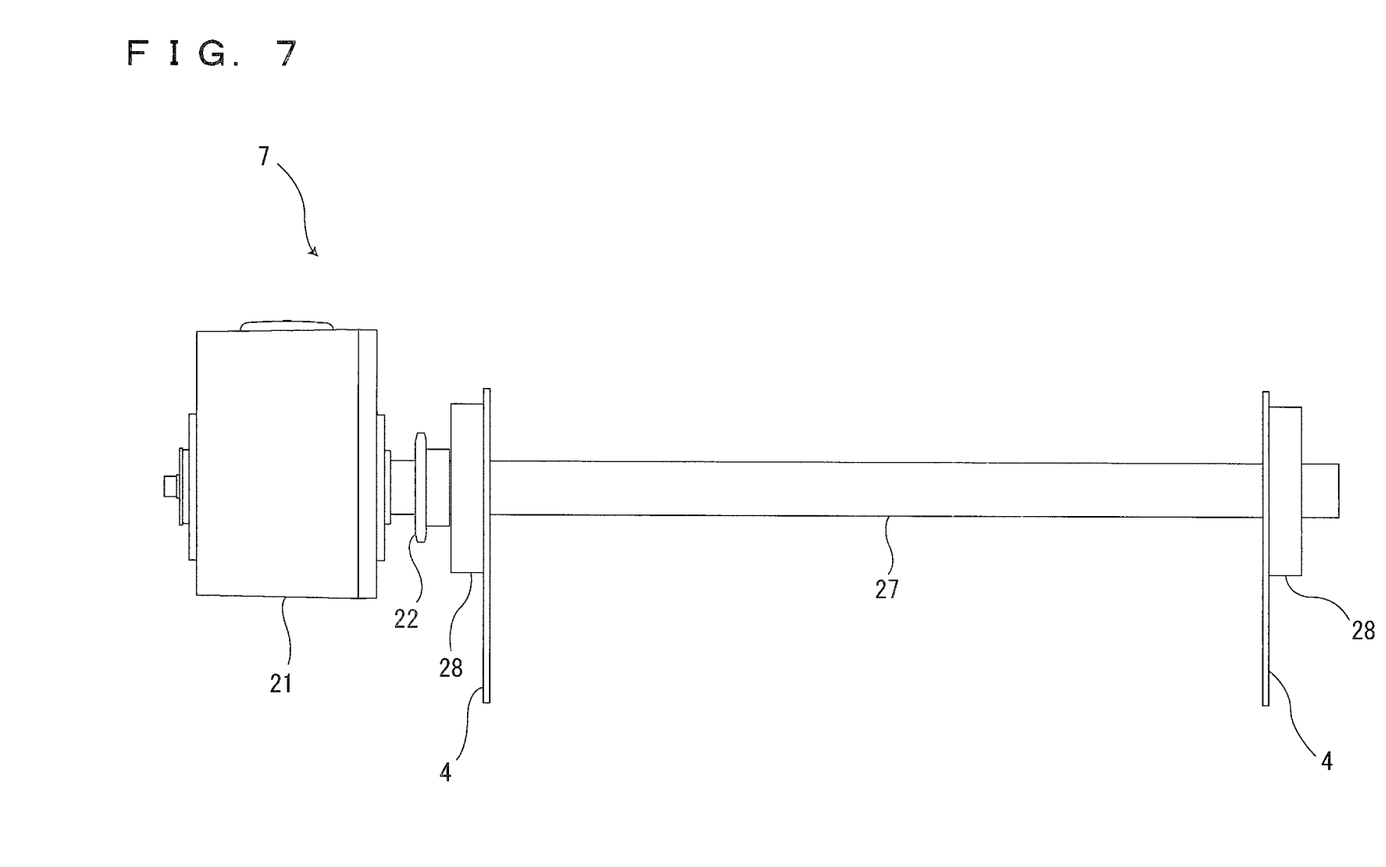
FIG. 7 is a rear view showing a driving mechanism configuration.

One end of each rotating shaft 9 projects from the bearing 13 on the outer side surface side of the side frame 4A on the drive side toward the driving mechanism 7. Such a projecting portion of each rotating shaft 9 as projecting from the above-mentioned bearing toward the driving mechanism 7 is mounted and fixed with a driving sprocket 14 integrally rotated with each rotating shaft 9. The driving sprocket 14 is specified as a sprocket for driving each rotating shaft 9 and constitutes part of the driving mechanism 7. The details thereof will be described later.

With this configuration, the elliptic-shaped rotating plates 12 are configured so as to mutually repeat every ¼ period a projected state of being projected toward both their upper and lower sides in such an attitude that their longitudinal direction (their major axis direction) is oriented in the vertical direction perpendicular to each guide bar 11 in side view and a non-projected state of being not projected toward both their upper and lower sides in such an attitude that their longitudinal direction (their major axis direction) is oriented in the longitudinal direction parallel to each guide bar 11 in side view, during the time when integrally rotated with each rotating shaft 9. The projected state and the non-projected state are repeated to thereby provide efficient separation of the liquid from the treated object.

By the way, the occurrence of clogging or the like of the treated object in between the mutually adjacent rotating plates 12, 12 in the lateral direction at the time of the upward projected state of the rotating plates 12 sometimes causes a situation in which a load in the lateral direction (the axial direction of each rotating shaft 9) acts on such rotating plates 12. This load bends and deforms the rotating plates 12 in the axial direction of each rotating shaft 9 and thereby causes damages to the rotating plates and, besides, suspension of works as well.

In order to prevent such damages and/or suspension of works, each rotating plate 12 is formed of a metal plate spring made of SUS301CSP or the like. Thus, in cases where a force in the axial direction of each rotating shaft 9 acts on each rotating plate 12 of the metal plate spring for the above-mentioned reasons or the like, each rotating plate of the metal plate spring is elastically deformed by bending in the axial direction of each rotating shaft 9 (the direction along each rotating shaft 9) as shown by an imaginary line in FIG. 5, and is then returned to its original shape when the force thus acting is released, resulting in that the damages to the rotating plates 12 are prevented, and besides, no suspension of works is caused.

Incidentally, the space between the rotating plates 12, 12 mounted on the same rotating shaft 9 while being mutually adjacent in the axial direction of each rotating shaft 9 is held by a circular ring-shaped spacer 16 externally fitted to each rotating shaft 9. In addition, each rotating plate 12 to be mounted in the axial direction of each rotating shaft 9 is installed in the same position for all the plurality of mutually adjacent rotating shafts 9 in the longitudinal direction.

With this configuration, the plurality of rotating plates 12 are longitudinally arranged in one straight line in planar view to configure a line of rotation L. The line of rotation L includes a plurality of lines of rotation arranged in parallel in the lateral direction at uniform intervals in order to form a longitudinal conveyance face. This conveyance face is substantially horizontal at the time when the apparatus body 2 is in the horizontal attitude, while being changed to an inclined state of being inclined upward toward the treated object sending direction at the time when the apparatus body 2 is in the inclined attitude.

In addition, the rotating plate 12 located on the most downstream (foremost) side in the treated object sending direction is formed in a circular shape in side view. Meanwhile, the rotating plates 12 other than the above-mentioned circular-shaped rotating plate are formed in an elliptic shape with an intersection point between its longer and shorter axes as a rotation center in side view. The mutually adjacent rotating plates 12, 12 in the treated object sending direction have the same radius of the rotation locus D or, alternatively, are set such that the rotating plate 12 on the downstream side (a forward side) in the sending direction has a smaller radius of the rotation locus D than the rotating plate 12 on the upstream side (a backward side) in the sending direction.

More specifically, as shown in FIG. 4, the plurality of rotating plates 12 configuring one line of rotation L are composed of four types of rotating plates including a plurality of first rotating plates 12A each specified as the rotating plate 12 in which the radius of the rotation locus D is taken as a first radius R1 which is a maximum radius of the rotation locus D, a second rotating plate 12B specified as the rotating plate 12 in which the radius of the rotation locus D is taken as a second radius R2 which is smaller than the first radius R1, a plurality of third rotating plates 12C each specified as the rotating plate 12 in which the radius of the rotation locus D is taken as a third radius R3 which is smaller than the second radius R2, and a fourth rotating plate 12D specified as the circular-shaped rotating plate 12 in which the radius of the rotation locus D is taken as a fourth radius R4 which is a minimum radius of the rotation locus D.

In addition, the second rotating plate 12B is arranged forward of a group of the first rotating plates 12A, a group of the third rotating plates 12C is arranged forward of the second rotating plate 12B, and the fourth rotating plate 12D is arranged forward of the group of the third rotating plates 12C.

Further, a distance between the mutually adjacent rotating plates 12, 12 in the treated object sending direction (the longitudinal direction) is set shorter, as the radius of the rotation locus D of each of the mutually adjacent rotating plates becomes smaller. In other words, predetermined spaces S1 can be secured at all times between the mutually adjacent rotating plates 12, 12 in the treated object sending direction even during rotation of each rotating plate 12.

Furthermore, the mutually adjacent elliptic-shaped rotating plates 12A, 12B, 12C in the treated object sending direction are so arranged that their rotation loci D are overlapped with each other in side view, while their phases are mutually shifted by ¼ period. Meanwhile, for the mutually adjacent circular-shaped fourth rotating plate 12D and elliptic-shaped third rotating plate 12C in the longitudinal direction, their rotation loci D are in non-overlapped condition in side view.

Incidentally, the rotation locus D of the fourth rotating plate 12D is the same as the side surface shape of the rotating plate 12 itself, so that the rotating plates 12 to be operated to alternately repeat the projected state and the non-projected state are limited to the first, second and third rotating plates 12A, 12B, 12C.

Each guide bar 11 has a wedge-like cross sectional shape with a gradually downwardly reduced lateral width while being formed in the treated object sending direction. This longitudinally extending guide bar 11 is arranged between the mutually adjacent lines of rotation L, L (the mutually adjacent rotating plates 12, 12 in the lateral direction) in a non-contact manner while being close to right above each rotating shaft 9.

Each guide bar 11 and the rotating plate 12 adjacent thereto are not in contact, so that there is formed a slit (a space) S2 between the mutually adjacent guide bar and rotating plate. The slit S2 includes two slits respectively formed between the mutually adjacent rotating plates 12, 12 in the lateral direction (the lines of rotation L, L) In addition, each slit S2 has a gradually downwardly increased lateral width due to the wedge-like cross sectional shape of each guide bar 11.

When each rotating plate 12 is rotationally driven in a normal rotation direction (counterclockwise as shown by an arrow in FIG. 1) after introduction of the treated object from the upstream side (the rear end) of the conveyance face, the conveyance face gets changed to a wave-shaped state by the first, second and third rotating plates 12A, 12B, 12C in which their phases are sequentially shifted in the longitudinal direction while the projected state and the non-projected state are mutually repeated, and therefore, when the rotating plates 12 are projected upward from the guide bars 11, an outer edge portion of each rotating plate 12 thus projected upward gets displaced forward to thereby successively convey the treated object forward.

In the course of this conveyance process, the liquid contained in the treated object is allowed to drop through both of the spaces S1 formed between the mutually adjacent rotating plates 12, 12 in the longitudinal direction and the slits S2 formed between the mutually adjacent rotating plates 12, 12 in the lateral direction, followed by being stored in the waste liquid tank 3. Thus, separation of the liquid from the treated object is successively performed through the process (the conveyance process) of sending the treated object in this manner, resulting in a decrease in percentage of the liquid content in the treated object.

The treated object having reached the most downstream side comes to be in a state close to the solid through sufficient extraction of the liquid, wherein the treated object after subjected to liquid extraction is discharged through a discharge port 18, followed by being guided in a slantingly downwardly forward direction in such a manner as to slide down on a discharge guide member 19. Thus, separation of the treated object into the liquid and the solid (solid-liquid separation) is performed in this way.

In addition, each slit S2 specified as the space between the mutually adjacent guide bars 11, 11 in the lateral direction is configured so as to be successively expanded downward, so that the liquid once passed through an upper end of each slit S2 is allowed to smoothly drop into the waste liquid tank 3.

Next will be described a configuration of the driving mechanism 7 with reference to FIGS. 1, 2, 7 and 8.

FIG. 7 is a rear view showing a driving mechanism configuration. The driving mechanism 7 has the plurality of driving sprockets 14 each mounted and fixed to the end of each rotating shaft 9, a motor (an actuator) 21 installed at the rear of the apparatus body 2, an active sprocket 22 rotationally driven by the motor 21, a following sprocket 23 installed at the front of the apparatus body 2, and an annular-shaped power transmission chain (a chain) 26 wound around the diving sprockets 14, the active sprocket 22 and the following sprocket 23 to transmit power of the active sprocket 22 to each driving sprocket 14 (each rotating shaft 9) at the same rotational speed.

The active sprocket 22 is mounted and fixed to an output shaft 27 of the motor 21. The output shaft 27 is laid and supported between the left and right side frames 4, 4 through bearings 28, 28 in a rotatable manner. In addition, the active sprocket 22 is arranged between the bearing 28 on the motor 21-side and the motor 21.

The following sprocket 23 is arranged further forward of the plurality of driving sprockets 14. Incidentally, a longitudinally extending single support member 29 is disposed close to right below the driving sprockets 14 longitudinally arranged in parallel.

The support member 29 has a longitudinally extending angle-shaped support frame 31 formed in an inverted L-shape in front view, and a plurality of support members 32 provided for the respective driving sprockets 14 while being integrally protruded upward from a flat upper surface of the support frame 31. Each support member 32 is to perform support for maintaining engagement of the power transmission chain 26 with the driving sprockets 14 in such a manner as to support the power transmission chain 26 from below.

With this configuration, when the active sprocket 22 is driven by the motor 21 in a normal rotation direction (clockwise as shown by an arrow in FIG. 2), the power of the active sprocket is transmitted to each driving sprocket 14 to rotationally drive each rotating plate 12 in the normal rotation direction (counterclockwise as shown in FIG. 2), thus allowing conveyance of the treated object to the downstream side by being accompanied by the liquid extraction to be performed.

Figure 8:
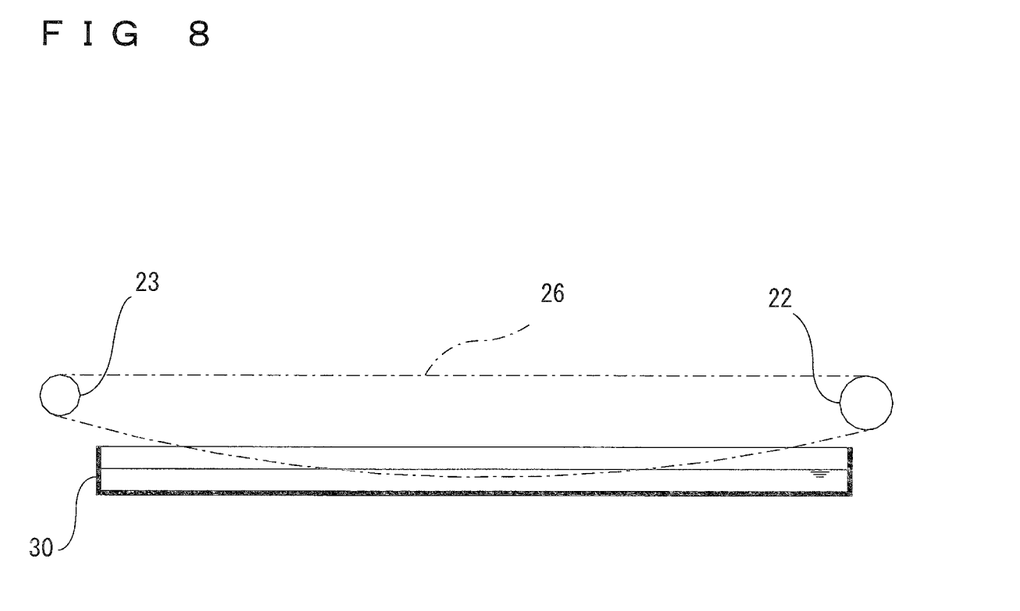
FIG. 8 is a side view showing a configuration for feeding lubricating oil to a power transmission chain.

FIG. 8 is a side view showing a configuration for feeding lubricating oil to the power transmission chain. A lower side portion of an annular-shaped endless track of the power transmission chain 26 for transmitting rotation power from the motor 21 to each rotating shaft 9 is in a sagged-down form without the presence of the sprockets to be supported from below. An oil tank (an oil reservoir part) 30 with its top opened is disposed close to right below the power transmission chain 26.

In addition, at least part of the sagged-down lower side portion of the power transmission chain 26 is immersed in the lubricating oil stored in the oil tank. During transmission of the power through the power transmission chain 26, the power transmission chain 26 over the entire range gets subjected to immersion in the lubricating oil, and accordingly, the lubricating oil is fed also to each of the sprockets 14, 22, 23 brought into engagement with the power transmission chain 26, so that the need for periodic work of feeding the lubricating oil to these sprockets is eliminated.

Incidentally, the driving mechanism 7 having the above configuration is covered on its top and both sides with a side cover 35.

Next will be described a configuration of the compressing mechanism 8 with reference to FIGS. 1 to 3.

The compressing mechanism 8 has a compressing plate (a compressing member) 33 located close to right above the conveyance face while being supported in a vertically swingable manner with a portion close to the rear of the upper end of the apparatus body 2 as a fulcrum, and an air cylinder (an actuator) 34 for elastically pressing the compressing plate 33 downward.

The compressing plate 33 is configured such that its rear part is bent upward relative to its midway and front parts so that a rear end of the bent rear part is pivotally supported on the frame body 2a-side of the apparatus body 2 through a laterally extending swinging shaft 36. A lateral width of the compressing plate 33 is set to be substantially equal to or slighter narrower than a distance between the left and right side frames 4, 4, while a longitudinal length of the compressing plate 33 is set to be substantially equal to or slightly shorter than an overall length of the conveyance face.

In addition, a lower surface of the compressing plate 33 is provided with a plurality of downwardly projecting resistive bodies (protrusions) 37 side by side in the treated object sending direction. Each resistive body 37 is arranged in a range where no overlapping with the rotation locus D of any rotating plate 12 is caused. Further, each resistive body 37 is configured so as to cause a conveyance resistance of the treated object by forming each resistive body in a wedge-like shape specified as a shape which is not along the rotation locus D of any rotating plate 12.

It is noted that the resistive bodies 37 may be formed in any shape, as long as their shape is suitable to cause the conveyance resistance, and therefore, rectangular or other polygonal-shaped resistive bodies will do. Incidentally, a shape which is along the rotation locus D of each rotating plate 12 is considered to be a circular-arc or like shape which is in close proximity to the rotation locus D, and it is thus to be noted that it is important for the present embodiment to avoid forming the resistive bodies 37 in such a shape as being in close proximity to the rotation locus.

The air cylinder 34 is mounted to and supported by a lateral center of an inverted U-shaped support frame 38 in front view which is laid between the left and right side frames 4, 4 at a front end of the apparatus body 2. When the air cylinder 34 is extended, a front end of the compressing plate 33 is elastically pressed downward from its upper surface side, whereas when the air cylinder 34 is contracted, downward pressing by the compressing plate 33 is released.

The treated object being present between the compressing plate 33 and the conveyance face is compressed in such a manner as to be pressed downward from its upper side by downward pressing by the compressing plate 33, thus allowing separation of the liquid from the treated object to be promoted. It is to be noted that a gas spring and/or a compressing spring or like energizing member for elastically pressing the compressing plate 33 downward may be also used instead of the air cylinder 34.

According to the compressing mechanism 8 having the above configuration, the treated object being successively sent forward by the plurality of rotating plates 12 is compressed by the compressing plate 33, thus allowing a separating action for the liquid from the treated object to be promoted. Besides, the plurality of resistive bodies 37 longitudinally arranged side by side can further promote an effect of separation of the liquid from the treated object.

According to the solid-liquid separation apparatus 1 having the above configuration, since the radius of the rotation locus D of each rotating plate 12 is successively smaller toward the sending direction, the space between the compressing plate 33 and the conveyance face gets gradually narrower in the sending direction. Therefore, any abrupt extraction of the liquid is prevented so that a liquid extraction treatment is performed stepwise, thus allowing the liquid to be efficiently separated from the treated object.

In addition, since the air cylinder 34 for elastically pressing the compressing plate 33 downward is capable of adjusting an elastic pressing force by the drive force of the air cylinder, an optimum pressing force corresponding to the kind of treated objects can be applied on the treatment part, thus providing more efficient solid-liquid separation.

In addition, the resistive bodies 37 provided on the compressing plate 33 can further improve a liquid extraction effect to be obtained by the compressing plate 33.

Moreover, the rotational plates 12 provide a function for preventing the treated object from being clogged in the slit 17, in addition to a function for successively sending the treated object forward.

The invention claimed is:

1. A separation apparatus for separating a liquid from a treated object containing the liquid, the separation apparatus comprising:
   a plurality of rotating shafts formed in a direction crossing a treated object sending direction in planar view while being arranged in parallel in the treated object sending direction;
   a driving device for rotationally driving each rotational shaft;
   a plurality of rotating plates mounted on each rotating shaft in parallel in an axial direction while being in such an attitude that their plate thickness direction is oriented in a direction along each rotating shaft; and
   a compressing member for compressing the treated object being sent by rotation of said rotating plates in such a manner as to press the treated object downward from its upper side;
   wherein spaces through which the liquid contained in the treated object is allowed to drop are formed between the mutually adjacent rotating plates in said treated object sending direction or the axial direction of said each rotating shaft;
   some of said rotating plates are upwardly projectable rotating plates, said upwardly projectable rotating plates being configured so as to periodically repeat a state of being projected upward and a state of being not projected upward during rotation by the driving device, while being elastically deformable in a direction along said each rotating shaft;
   said rotating plate includes an elastically deformable metal plate spring;
   the mutually adjacent rotating plates in the lateral direction are configured to be elastically deformed by bending in the direction along the rotating shaft, when the treated object is clogged in between the rotating plates at the time of the upward projected state of said upwardly projectable rotating plates;
   the treated object is sent with each rotating plate rotationally driven by said driving device to thereby perform separation of the liquid from the treated object;
   a lower surface of said compressing member is integrally formed with a downwardly projecting protrusion, and
   said protrusion is provided so as not to be along a rotation locus of any rotating plate in a range where non-overlapping with said rotation locus is caused, as viewed in the axial direction of said each rotating shaft.

2. The separation apparatus according to claim 1, wherein said rotating plate is formed in an elliptic shape.

3. The separation apparatus according to claim 1, wherein said protrusion includes a plurality of protrusions formed on the lower surface of the compressing member.

4. The separation apparatus according to claim 1, wherein said driving device has an actuator and an annular-shaped chain and is configured so as to transmit power of said actuator to said each rotating shaft through said chain,
   an oil reservoir part in which lubricating oil is stored is provided below said chain; and
   said chain is configured so as to have a sagged-down lower side portion such that at least its part is immersed in said oil reservoir part.

* * * * *